United States Patent
Youm et al.

(10) Patent No.: US 11,091,634 B2
(45) Date of Patent: Aug. 17, 2021

(54) THERMOPLASTIC RESIN COMPOSITION AND MOLDED PRODUCT PRODUCED THEREFROM

(71) Applicant: LOTTE ADVANCED MATERIALS CO., LTD., Yeosu-si (KR)

(72) Inventors: Kyoung Tae Youm, Uiwang-si (KR); Yeong Deuk Seo, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 32 days.

(21) Appl. No.: 16/474,235

(22) PCT Filed: Dec. 29, 2017

(86) PCT No.: PCT/KR2017/015745
§ 371 (c)(1),
(2) Date: Jun. 27, 2019

(87) PCT Pub. No.: WO2018/124817
PCT Pub. Date: Jul. 5, 2018

(65) Prior Publication Data
US 2020/0123378 A1    Apr. 23, 2020

(30) Foreign Application Priority Data

Dec. 30, 2016 (KR) .................. 10-2016-0184490
Dec. 29, 2017 (KR) .................. 10-2017-0183768

(51) Int. Cl.
*C08L 71/12* (2006.01)
*C08L 51/04* (2006.01)

(52) U.S. Cl.
CPC ............. *C08L 71/123* (2013.01); *C08L 51/04* (2013.01); *C08L 2205/025* (2013.01); *C08L 2205/03* (2013.01); *C08L 2205/035* (2013.01)

(58) Field of Classification Search
CPC .. C08L 71/123; C08L 51/04; C08L 2205/035; C08L 2205/03; C08L 2205/025
See application file for complete search history.

(56) References Cited

U.S. PATENT DOCUMENTS

| | | |
|---|---|---|
| 8,969,444 B2 | 3/2015 | Lee et al. |
| 2012/0214929 A1 | 8/2012 | Fishbum et al. |
| 2014/0088236 A1 | 3/2014 | Ziegler et al. |

FOREIGN PATENT DOCUMENTS

| | | |
|---|---|---|
| CN | 103421296 A | 12/2013 |
| JP | 61-111354 A | 5/1986 |
| JP | 2016-194030 A | 11/2016 |
| KR | 10-2014-0014176 A | 2/2014 |
| KR | 10-2014-0103470 A | 8/2014 |
| KR | 10-2014-0131652 A | 11/2014 |
| KR | 10-2014-0131654 A * | 11/2014 |
| KR | 10-2016-0067832 A | 6/2016 |
| WO | 2015/049635 A1 | 4/2015 |
| WO | 2018/124817 A1 | 7/2018 |

OTHER PUBLICATIONS

International Search Report in counterpart International Application No. PCT/KR2017/015745 dated Apr. 9, 2018, pp. 1-4.
Extended Search Report in counterpart European Application No. 17889410.1 dated Jul. 13, 2020, pp. 1-6.

* cited by examiner

*Primary Examiner* — Robert D Harlan
(74) *Attorney, Agent, or Firm* — Additon, Pendleton & Witherspoon, P.A.

(57) ABSTRACT

The present invention relates to a thermoplastic resin composition and a molded product produced therefrom. In one embodiment, the thermoplastic resin composition comprises: a base resin including a polyphenylene ether resin and a rubber-reinforced polystyrene resin; a styrene-based block copolymer resin; and a hydrocarbon-based oil.

8 Claims, No Drawings

THERMOPLASTIC RESIN COMPOSITION AND MOLDED PRODUCT PRODUCED THEREFROM

CROSS-REFERENCE TO RELATED APPLICATIONS

This application claims priority to and the benefit of International Application No. PCT/KR2017/015745, filed Dec. 29, 2017, which published as WO 2018/124817 on Jul. 5, 2018; Korean Patent Application No. 10-2016-184490, filed in the Korean Intellectual Property Office on Dec. 30, 2016; and Korean Patent Application No. 10-2017-183768, filed in the Korean Intellectual Property Office on Dec. 29, 2017, the entire disclosure of each of which is incorporated herein by reference.

TECHNICAL FIELD

The present invention relates to a thermoplastic resin composition and a molded product produced therefrom.

BACKGROUND ART

Thermoplastic plastic materials have good properties in terms of light weight, degree of design freedom, molding processability, and the like, and thus are broadly applied to various fields, which require various functions and performance, as industrial materials for household goods, automobiles, electric/electronic products, and the like. In recent years, wearable devices designed to be worn on the human body are developed using such thermoplastic plastic materials. There are various kinds of wearable devices including glasses, shoes, rings, belts, wrist watches/bands/bracelets, necklaces, earring sets, clothing, or badges depending on wearing position on the human body.

Among such thermoplastic plastic materials, a polyphenylene ether (PPE) resin is a non-crystalline thermoplastic resin which has good properties in terms of dimensional stability, heat resistance, rigidity, electrical insulation, abrasion resistance, and the like, and can be applied to various fields, such as components of electric/electronic products, automobile precision components, and the like.

However, the polyphenylene ether resin has a disadvantage of negative melt processability due to a high glass transition temperature (Tg) thereof. Accordingly, there are various studies for development and application of a modified polyphenylene ether resin (m-PPE) that can secure processability while maintaining inherent properties of the polyphenylene ether resin (PPE) by selective blending of the polyphenylene ether resin (PPE) with various kinds of resins having relatively low glass transition temperatures so as to fulfil desired properties of components, instead of using the polyphenylene ether resin alone. For example, the polyphenylene ether resin is blended with Nylon, a polypropylene resin, a polystyrene resin, or a polyester resin to improve processability.

On the other hand, blending the polyphenylene ether resin and other resins to improve melt processability can be accompanied by deterioration in inherent properties of the polyphenylene ether resin. In particular, upon blending the polyphenylene ether resin with a polystyrene resin which exhibits thermodynamically complete comparability therewith, there is a problem of deterioration in heat resistance, particularly impact resistance, depending upon a mixing ratio thereof.

The background technique of the present invention is disclosed in Korean Patent Laid-open Publication No. 2016-0067832 and the like.

DISCLOSURE

Technical Problem

It is one aspect of the present invention to provide a thermoplastic resin composition having good impact resistance and heat resistance.

It is another aspect of the present invention to provide a thermoplastic resin composition having good properties in terms of compatibility, fluidity, and molding processability.

It is a further aspect of the present invention to provide a thermoplastic resin composition having low specific gravity to ensure good lightweight properties.

It is yet another aspect of the present invention to provide a molded product formed of the thermoplastic resin composition as set forth above.

Technical Solution

One aspect of the present invention relates to a thermoplastic resin composition. In one embodiment, the thermoplastic resin composition includes: 100 parts by weight of a base resin including about 20% by weight (wt %) to about 80 wt % of a polyphenylene ether resin and about 20 wt % to about 80 wt % of a rubber-reinforced polystyrene resin; about 1 part by weight to about 20 parts by weight of a styrene-based block copolymer resin; and about 0.5 parts by weight to about 15 parts by weight of a hydrocarbon-based oil.

In one embodiment, the polyphenylene ether resin may include at least one selected from among poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, a copolymer of poly(2,6-dimethyl-1,4-phenylene)ether and poly(2,3,6-trimethyl-1,4-phenylene)ether, and a copolymer of poly(2,6-dimethyl-1,4-phenylene)ether and poly(2,3,6-triethyl-1,4-phenylene)ether.

In one embodiment, the rubber-reinforced polystyrene resin may include a first rubber-reinforced polystyrene resin and a second rubber-reinforced polystyrene resin in a weight ratio of about 0.3:1 to about 5:1, wherein the first rubber-reinforced polystyrene resin includes a rubber polymer having an average particle diameter of about 0.1 μm to less than about 0.8 μm and the second rubber-reinforced polystyrene resin includes a rubber polymer having an average particle diameter of about 0.8 μm to about 4 μm.

In one embodiment, the styrene-based block copolymer resin may be a block copolymer including repeat units of soft segment-hard segment-soft segment, in which the soft segment includes a repeat unit derived from ethylene, isoprene, propylene or butylene, and the hard segment includes a repeat unit derived from styrene.

In one embodiment, the styrene-based block copolymer resin may include about 10 wt % to about 40 wt % of the hard segment and about 60 wt % to about 90 wt % of the soft segment.

In one embodiment, the hydrocarbon-based oil may include about 20 wt % to about 40 wt % of naphthene oil and about 60 wt % to about 80 wt % of paraffin oil.

In one embodiment, the hydrocarbon-based oil may have a weight average molecular weight of about 500 g/mol to about 1,000 g/mol, a specific gravity of about 0.5 to about 1.0 under conditions of 4° C. and 1 atm., a pour point of about −20° C. to about 0° C., a flash point of about 200° C. to about 350° C., and a kinematic viscosity of about 50 cSt to about 300 cSt at 40° C.

In one embodiment, the hydrocarbon-based oil and the polyphenylene ether resin may be present in a weight ratio of about 1:4 to about 1:20.

The styrene-based block copolymer resin and the polyphenylene ether resin may be present in a weight ratio of about 1:4 to about 1:10.

In one embodiment, the thermoplastic resin composition may have a melt index of about 17 g/10 min to about 35 g/10 min, as measured in accordance with ASTM D1238 (280° C., 5 kg), and a heat deflection temperature (HDT) of about 103° C. or more, as measured on a 6.4 mm thick specimen under a load of 18.6 kgf/cm$^2$ in accordance with ASTM D648.

In one embodiment, the thermoplastic resin composition may have an Izod impact strength of about 25 kgf·cm/cm to about 50 kgf·cm/cm, as measured on a ⅛" thick specimen in accordance with ASTM D256.

Another aspect of the present invention relates to a molded product formed of the thermoplastic resin composition as set forth above.

Advantageous Effects

A thermoplastic resin composition according to the present invention and the molded product produced therefrom exhibit good properties in terms of impact resistance, heat resistance, compatibility, fluidity, and molding processability, and have low specific gravity to ensure good lightweight properties.

BEST MODE

In the following description of embodiments of the present invention, description of known functions and constructions which can unnecessarily obscure the subject matter of the present invention will be omitted herein.

Further, the terms used herein are defined by taking functions of the present invention into account and can be changed according to user or operator's custom or intention. Therefore, definition of the terms should be made according to the overall disclosure set forth herein.

Thermoplastic Resin Composition

One aspect of the present invention relates to a thermoplastic resin composition. The thermoplastic resin composition includes (A) a polyphenylene ether resin, (B) a rubber-reinforced polystyrene resin, (C) a styrene-based block copolymer resin, and (D) a hydrocarbon-based oil. In one embodiment, the thermoplastic resin composition includes: 100 parts by weight of a base resin including about 20 wt % to about 80 wt % of (A) the polyphenylene ether resin and about 20 wt % to about 80 wt % of (B) the rubber-reinforced polystyrene resin; about 1 part by weight to about 20 parts by weight of (C) the styrene-based block copolymer resin; and about 0.5 parts by weight to about 15 parts by weight of (D) the hydrocarbon-based oil.

Hereinafter, components of the thermoplastic resin composition will be described in detail.

(A) Polyphenylene Ether Resin

According to the present invention, the polyphenylene ether resin (A) may include at least one selected from among poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, a copolymer of poly(2,6-dimethyl-1,4-phenylene)ether and poly(2,3,6-trimethyl-1,4-phenylene)ether, and a copolymer of poly(2,6-dimethyl-1,4-phenylene)ether and poly(2,3,6-triethyl-1,4-phenylene)ether.

In one embodiment, the polyphenylene ether resin (A) may have an inherent viscosity of about 0.2 dl/g to about 1.0 dl/g, as measured in chloroform as a solvent at 25° C. Under this condition, the polyphenylene ether resin (A) can secure good heat resistance and workability.

In one embodiment, the polyphenylene ether resin (A) may be present in an amount of about 20 wt % to about 80 wt % based on the total weight of the base resin. If the content of the polyphenylene ether resin (A) is less than about 20 wt %, the thermoplastic resin composition can suffer from deterioration in heat resistance, and if the content thereof exceeds about 80 wt %, the thermoplastic resin composition can suffer from deterioration in impact resistance, molding processability and fluidity. For example, the polyphenylene ether resin (A) may be present in an amount of about 35 wt % to about 65 wt %. Alternatively, the polyphenylene ether resin (A) may be present in an amount of about 40 wt % to about 60 wt %. For example, the polyphenylene ether resin (A) may be present in an amount of about 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, or 80 wt %.

(B) Rubber-Reinforced Polystyrene Resin

According to the present invention, the rubber-reinforced polystyrene resin (B) may be prepared through polymerization of a rubber polymer and a styrene monomer.

Examples of the rubber polymer may include diene rubbers, such as polybutadiene, a copolymer rubber of butadiene and styrene, and a copolymer rubber of butadiene and acrylonitrile; saturated rubbers obtained by adding hydrogen to the diene rubbers; isoprene rubbers; acrylic rubbers such as alkyl acrylate rubbers; and ethylene-propylene-diene monomer terpolymer (EPDM). For example, the rubber polymer may be diene rubbers, a copolymer rubber of butadiene and styrene, isoprene rubbers, and alkyl acrylate rubbers.

In one embodiment, the rubber polymer may be present in an amount of about 1 wt % to about 30 wt % based on the total weight of the rubber-reinforced polystyrene resin (B). Within this content of the rubber polymer, the thermoplastic resin composition can have good properties in terms of impact resistance and fluidity. For example, the rubber-reinforced polystyrene resin (B) may include about 3 wt % to about 15 wt % of the rubber polymer.

In one embodiment, in the base resin including the polyphenylene ether resin and the rubber-reinforced polystyrene resin, the rubber polymer may have a Z-average particle diameter of about 0.1 μm to about 4.0 μm, for example, about 0.25 μm to about 3.0 μm, in order to ensure suitable properties.

In one embodiment, the rubber-reinforced polystyrene resin (B) may include the rubber polymer dispersed in a bimodal or trimodal mode. In one embodiment, the rubber-reinforced polystyrene resin (A) may include a first rubber-reinforced polystyrene resin, which includes a rubber polymer having a Z-average average particle diameter of about 0.1 μm to less than about 0.8 μm, and a second rubber-reinforced polystyrene resin, which includes a rubber polymer having a Z-average particle diameter of about 0.8 μm to about 4 μm. For example, the rubber-reinforced polystyrene resin (A) may include the first rubber-reinforced polystyrene resin (B1) and the second rubber-reinforced polystyrene resin (B2) in a weight ratio of about 0.3:1 to about 5:1. Within this range of weight ratio, the thermoplastic resin composition can exhibit good properties in terms of compatibility, molding processability, and mechanical properties such as impact strength. For example, the first rubber-reinforced polystyrene resin (B1) and the second rubber-reinforced polystyrene resin (B2) may be present in a weight ratio of about 0.5:1 to about 3.5:1.

The styrene monomer may include, for example, styrene, α-methylstyrene, β-methylstyrene, p-methylstyrene, p-t-butylstyrene, and ethylstyrene, without being limited thereto. The styrene monomer may be present in an amount of about 70 wt % to about 99 wt % based on the total amount of the rubber-reinforced polystyrene resin. For example, the styrene monomer may be present in an amount of about 85 wt % to about 97 wt %.

exceeds about 80 wt %, the thermoplastic resin composition can suffer from deterioration in heat resistance, molding processability and fluidity. In one example, the rubber-reinforced polystyrene resin (B) may be present in an amount of about 35 wt % to about 65 wt %. Alternatively, the rubber-reinforced polystyrene resin (B) may be present in an amount of about 40 wt % to about 60 wt %. For example, the rubber-reinforced polystyrene resin (B) may be present in an amount of about 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, or 80 wt %.

(C) Styrene-Based Block Copolymer Resin

According to the present invention, the styrene-based block copolymer resin (C) serves to prevent deformation of a molded product produced from the thermoplastic resin composition and to ensure elastic properties of the molded product while improving hardness, heat resistance, chemical resistance, and fatigue resistance of the molded product.

In one embodiment, the styrene-based block copolymer resin may include a polymer represented by Formula 1.

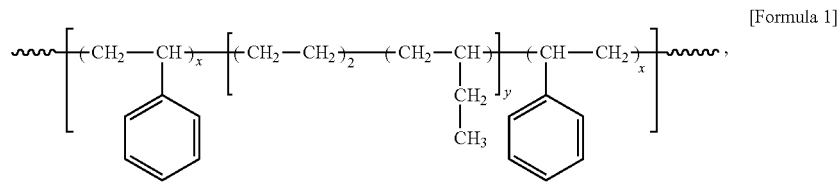

[Formula 1]

The rubber-reinforced polystyrene resin (B) may further include an alkyl ester monomer of acrylic acid or methacrylic acid and a vinyl cyanide compound in order to impart properties, such as chemical resistance, processability, and heat resistance, to the resin composition. The rubber-reinforced polystyrene resin (B) may be optionally present in an amount of about 40 wt % or less based on the total weight of the rubber-reinforced polystyrene resin (B).

The rubber-reinforced polystyrene resin (B) may be polymerized through heat polymerization without using a polymerization initiator or may be polymerized in the presence of the polymerization initiator. For polymerization in the presence of the polymerization initiator, peroxide-based compounds, such as benzoyl peroxide, t-butyl hydroperoxide, acetyl hydroperoxide, and cumene hydroperoxide, and azo-based compounds, such as azobis(isobutyronitrile), may be used as the polymerization initiator, without being limited thereto.

The rubber-reinforced polystyrene resin (B) may be prepared by bulk polymerization, suspension polymerization, emulsion polymerization or a combination thereof. Preferably, bulk polymerization is used.

The rubber-reinforced polystyrene resin (B) may be present in an amount of about 20 wt % to about 80 wt % based on the total weight of the base resin. If the content of the rubber-reinforced polystyrene resin is less than about 20 wt %, the thermoplastic resin composition can suffer from deterioration in impact resistance, and if the content thereof where X and Y are each an integer of 1 to 10.

In Formula 1, the styrene-based block copolymer resin includes one or more styrene-based repeat units. In one embodiment, the styrene-based block copolymer resin includes a hard segment preventing deformation of a resin and a soft segment exhibiting elastic properties, in which the styrene-based repeat unit is included as the hard segment.

For example, the styrene-based block copolymer resin (C) may be a ternary block copolymer including repeat units of soft segment-hard segment-soft segment.

In one embodiment, the soft segment may include a repeat unit derived from ethylene, isoprene, propylene, or butylene, and the hard segment may include a repeat unit derived from styrene or a styrene-containing monomer.

In one embodiment, the styrene-based block copolymer resin (C) may include about 10 wt % to about 40 wt % of the hard segment and about 60 wt % to about 90 wt % of the soft segment. Within these ranges, the thermoplastic resin composition can prevent deformation of a molded product produced therefrom and can exhibit good properties in terms of heat resistance, chemical resistance, and impact resistance. For example, the styrene-based block copolymer resin (C) may include about 20 wt % to about 35 wt % of the hard segment and about 65 wt % to about 80 wt % of the soft segment.

In one embodiment, the styrene-based block copolymer resin (C) may have a weight average molecular weight of about 50,000 g/mol to about 300,000 g/mol. For example, the styrene-based block copolymer resin (C) may have a weight average molecular weight of about 100,000 g/mol to about 200,000 g/mol. In addition, the styrene-based block copolymer resin (C) may have a melt index of about 0.1 g/10 min to about 10 g/10 min (in accordance with ASTM D1238 under conditions of 280° C. and 5 kg). Within these ranges of weight average molecular weight and melt index, the thermoplastic resin composition can exhibit good properties in terms of formability, heat resistance, chemical resistance, and impact resistance.

In one embodiment, the styrene-based block copolymer resin (C) may have a Brookfield viscosity of about 1,000 cps to about 2,500 cps, as measured in 10% toluene at 25° C. Within this range, the thermoplastic resin composition can exhibit good properties in terms of formability, heat resistance, chemical resistance, and impact resistance.

In one embodiment, the styrene-based block copolymer resin (C) may be present in an amount of about 1 part by weight to about 20 parts by weight relative to 100 parts by weight of the base resin. If the content of the styrene-based block copolymer resin (C) is less than about 1 part by weight, it is difficult to ensure impact resistance and heat resistance of the thermoplastic resin composition, and if the content thereof exceeds about 20 parts by weight, the thermoplastic resin composition can suffer from deterioration in fluidity and formability. In one example, the styrene-based block copolymer resin (C) may be present in an amount of about 1 part by weight to about 15 parts by weight. Alternatively, the styrene-based block copolymer resin (C) may be present in an amount of about 1 part by weight to about 10 parts by weight. For example, the styrene-based block copolymer resin (C) may be present in an amount of about 1, 2, 3, 4, 5, 6, 7, 8, 9, 10, 11, 12, 13, 14, 15, 16, 17, 18, 19 or 20 parts by weight.

The styrene-based block copolymer resin and the polyphenylene ether resin may be present in a weight ratio of about 1:4 to about 1:10. Within this weight ratio of the styrene-based block copolymer resin and the polyphenylene ether resin, the thermoplastic resin composition can exhibit good properties in terms of fluidity, formability, heat resistance, and impact resistance. For example, the styrene-based block copolymer resin and the polyphenylene ether resin may be present in a weight ratio of about 1:4 to about 1:9.

(D) Hydrocarbon-Based Oil

The hydrocarbon-based oil (D) serves to ensure fluidity and formability of the thermoplastic resin composition by improving flowability of the thermoplastic resin composition.

In one embodiment, the hydrocarbon-based oil (D) may include about 20 wt % to about 40 wt % of naphthene oil and about 60 wt % to about 80 wt % of paraffin oil.

In one embodiment, the hydrocarbon-based oil (D) may have a weight average molecular weight of about 500 g/mol to about 1,000 g/mol, a specific gravity of about 0.5 to about 1.0 under conditions of 4° C. and 1 atm., a pour point of about −20° C. to about 0° C., a flash point of about 200° C. to about 350° C., and a kinematic viscosity of about 50 cSt to about 300 cSt at 40° C. For example, the hydrocarbon-based oil (D) may have a weight average molecular weight of about 600 g/mol to about 900 g/mol, a specific gravity of about 0.85 to about 0.90, for example, about 0.86 to about 0.88, under conditions of 4° C. and 1 atm., a pour point of about −20° C. to about 0° C., for example, about −18° C. to about −9° C., a flash point of about 270° C. to about 300° C., and a kinematic viscosity of about 100 cSt to about 220 cSt at 40° C. With the hydrocarbon-based oil under these conditions, the thermoplastic resin composition can have good properties in terms of fluidity and formability.

In one embodiment, the hydrocarbon-based oil (D) may be present in an amount of about 0.5 parts by weight to about 15 parts by weight relative to 100 parts by weight of the base resin. If the content of the hydrocarbon-based oil is less than about 0.5 parts by weight, the thermoplastic resin composition can suffer from deterioration in fluidity and formability, and if the content thereof exceeds about 15 parts by weight, the thermoplastic resin composition can suffer from deterioration in heat resistance and impact resistance. For example, the hydrocarbon-based oil (D) may be present in an amount of about 3 parts by weight to about 10 parts by weight. For example, the hydrocarbon-based oil (D) may be present in an amount of about 0.5, 1, 2, 3, 4, 5, 6, 7, 8, 9, 10, 11, 12, 13, 14 or 15 parts by weight.

In one embodiment, the hydrocarbon-based oil and the polyphenylene ether resin may be present in a weight ratio of about 1:4 to about 1:20. Within this weight ratio, the thermoplastic resin composition can exhibit good properties in terms of formability, heat resistance, and impact resistance. For example, the hydrocarbon-based oil and the polyphenylene ether resin may be present in a weight ratio of about 1:4 to about 1:10.

The thermoplastic resin composition may further include typical additives used in typical thermoplastic resin compositions within the range not affecting advantageous effects of the present invention. Examples of the additives may include a colorant, a stabilizer, an antioxidant, an antistatic agent, and a flow enhancer, without being limited thereto. The additives may be present in an amount of about 0.01 to about 20 parts by weight relative to 100 parts by weight of the base resin.

In one embodiment, the thermoplastic resin composition may be prepared in pellet form by mixing the aforementioned components, followed by melt extrusion in a typical twin-screw extruder at about 200° C. to about 300° C., specifically about 250° C. to about 280° C.

In one embodiment, the thermoplastic resin composition may have a melt index of about 17 g/10 min to about 35 g/10 min, as measured in accordance with ASTM D1238 (280° C., 5 kg). For example, the thermoplastic resin composition may have a melt index of about 20 g/10 min to about 35 g/10 min.

In one embodiment, the thermoplastic resin composition may have a heat deflection temperature (HDT) of about 103° C. or more, as measured on a 6.4 mm thick specimen under a load of 18.6 kgf/cm$^2$ in accordance with ASTM D648. For example, the thermoplastic resin composition may have an HDT of about 103° C. to about 120° C.

In one embodiment, the thermoplastic resin composition may have an Izod impact strength of about 25 kgf·cm/cm to about 50 kgf·cm/cm, as measured on a ⅛" thick specimen in accordance with ASTM D256. For example, the thermoplastic resin composition may have an Izod impact strength of about 27 kgf·cm/cm to about 45 kgf·cm/cm.

Molded Product Formed of Thermoplastic Resin Composition

Another aspect of the present invention relates to a molded product formed of the thermoplastic resin composition. The molded product has good properties in terms of impact resistance, heat resistance, compatibility, fluidity and molding processability, and has low specific gravity to ensure good lightweight properties. The molded product may be applied to various fields requiring these properties. For example, the molded product may be applied to industrial fields requiring low specific gravity, impact resistance, and heat resistance. For example, the molded product may be applied to electronic products, household goods, and medical supplies. For example, the thermoplastic resin composition may be used as interior/exterior materials for wearable devices or portable electronic devices.

Next, the present invention will be described in more detail with reference to some examples. It should be understood that these examples are provided for illustration only and are not to be construed in any way as limiting the invention.

MODE FOR INVENTION

Examples and Comparative Examples

Details of components used in Examples and Comparative Examples are as follows.

(A) Polyphenylene ether resin: LXR40 (Bluestar Co., Ltd.) was used.

(B1) First rubber-reinforced polystyrene resin: 576H (average particle diameter: 0.5 μm, Ineos-Styrolution Co., Ltd.) was used.

(B2) Second rubber-reinforced polystyrene resin: CT60 (average particle diameter: 1.2 μm, Idemitsu PS) was used.

(C1) Styrene-based block copolymer resin: A ternary block copolymer of hard segment (styrene)-soft segment (ethylene/butylene)-hard segment (styrene) having a weight average molecular weight of 150,000 g/mol and a Brookfield viscosity of 1,800 cps (10% toluene, 25° C.) (G1651, Kraton Co., Ltd.) was used.

(C2) Rubber-modified aromatic vinyl graft copolymer: An acrylonitrile-butadiene-styrene graft copolymer (g-ABS) obtained through graft copolymerization of 55 wt % of styrene and acrylonitrile (weight ratio: 75/25) on 45 wt % of butadiene rubber having a Z-average of 310 nm was used.

(D) Hydrocarbon-based oil: KL-900 (Seojin Chemical Co., Ltd.) comprising 28 wt % of naphthene oil and 72 wt % of paraffin oil and having a specific viscosity of 0.87 under conditions of 4° C. and 1 atm., a flash point of 288° C., and a kinematic viscosity of 172 cSt at 40° C. was used.

(E) Additive: A hindered phenol-based stabilizer (Irganox 1076, BASF) was used as a heat stabilizer.

Examples 1 to 4 and Comparative Examples 1 to 14

The above components were weighed in amounts as listed in Tables 1 to 3 and subjected to extrusion in a twin-screw extruder (L/D=36, Φ: 45 mm) at a barrel temperature of 250° C. to 300° C., thereby preparing pellets. The prepared pellets were dried at 80° C. to 100° C. for 4 hours or more and injection-molded in a 6 oz. injection molding machine (cylinder temperature: 300° C., mold temperature: 60° C.), thereby preparing specimens. The prepared specimens were evaluated as to the following properties by the following method, and results are shown in Tables 1 to 3.

Property Evaluation (1) Heat resistance (° C.): Heat deflection temperature (HDT) was measured on a 6.4 mm thick specimen under a load of 18.6 kgf/cm$^2$ in accordance with ASTM D648.

(2) Impact resistance (kgf·cm/cm): Izod impact strength was measured on a ⅛" thick specimen in accordance with ASTM D256.

(3) Fluidity (g/10 min): Melt index was measured under conditions of 280° C. and 5 kg in accordance with ASTM D1238.

(4) Specific gravity: Specific gravity was measured in accordance with ASTM D792.

TABLE 1

| | | Example | | Comparative Example | | | | | |
|---|---|---|---|---|---|---|---|---|---|
| Item | | 1 | 2 | 1 | 2 | 3 | 4 | 5 | 6 |
| (A) (wt %) | | 43 | 43 | 43 | 43 | 43 | 43 | 43 | 43 |
| (B1) (wt %) | | 57 | 57 | 57 | 57 | 57 | 57 | 57 | 57 |
| (C) (parts by weight) | (C1) | 5 | 5 | — | — | 3 | 5 | 8 | 10 |
| | (C2) | — | — | 3 | 5 | — | — | — | — |
| (D) (parts by weight) | | 5 | 10 | — | — | — | — | — | — |
| (E) (parts by weight) | | 1.8 | 1.8 | 1.8 | 1.8 | 1.8 | 1.8 | 1.8 | 1.8 |
| HDT | | 109 | 106 | 114 | 118 | 115 | 114 | 114 | 114 |
| Izod impact strength | | 29 | 40 | 14 | 15 | 20 | 23 | 26 | 26 |
| Melt index | | 25 | 32 | 16 | 16 | 19 | 18 | 16 | 16 |
| Specific viscosity | | 1.04 | 1.03 | 1.05 | 1.05 | 1.05 | 1.04 | 1.04 | 1.04 |

TABLE 2

| | | Example | | Comparative Example | | | |
|---|---|---|---|---|---|---|---|
| Item | | 3 | 4 | 7 | 8 | 9 | 10 |
| (A) (wt %) | | 43 | 40 | 43 | 43 | 43 | 40 |
| (B) (wt %) | (B1) | 29 | 45 | 29 | 29 | 29 | 45 |
| | (B2) | 28 | 15 | 28 | 28 | 28 | 15 |
| (C1) (parts by weight) | | 5 | 5 | — | 5 | 10 | 5 |
| (D) (parts by weight) | | 5 | 5 | — | — | — | — |
| (E) (parts by weight) | | 1.8 | 1.8 | 1.8 | 1.8 | 1.8 | 1.8 |
| HDT | | 108 | 103 | 120 | 118 | 117 | 119 |
| Izod impact strength | | 30 | 27 | 13 | 19 | 24 | 21 |
| Melt index | | 21 | 21 | 15 | 13 | 11 | 14 |
| Specific viscosity | | 1.03 | 1.04 | 1.04 | 1.04 | 1.04 | 1.05 |

TABLE 3

| Item | | Comparative Example | | | |
|---|---|---|---|---|---|
| | | 11 | 12 | 13 | 14 |
| (A) (wt %) | | 18 | 82 | 43 | 40 |
| (B) (wt %) | (B1) | 82 | 18 | 29 | 45 |
| | (B2) | — | — | 28 | 15 |
| (C1) (parts by weight) | | — | 5 | 23 | 5 |
| (D) (parts by weight) | | — | — | — | 18 |
| (E) (parts by weight) | | 1.8 | 1.8 | 1.8 | 1.8 |
| HDT | | 93 | 155 | 95 | 92 |
| Izod impact strength | | 30 | 15 | 20 | 21 |
| Melt index | | 11 | 10 | 9 | 32 |
| Specific viscosity | | 1.06 | 1.06 | 1.05 | 1.02 |

Referring to results shown in Tables 1 to 3, the thermoplastic composition resins of Examples 1 to 4 had low specific gravity and exhibited good properties in terms of fluidity, heat resistance, impact resistance, and balance therebetween.

Conversely, the compositions of Comparative Examples 1 and 2, which were free from the hydrocarbon-based oil and prepared using a rubber-modified aromatic graft copolymer instead of the styrene copolymer of the present invention, suffered from significant deterioration in fluidity and impact resistance, as compared with the compositions of Examples 1 to 4, and the compositions of Comparative Examples 3 to 6 and 8 to 10, which were prepared without using the hydrocarbon-based oil, suffered from deterioration in fluidity and impact resistance, as compared with the compositions of Examples 1 to 4.

In addition, the compositions of Comparative Examples 11 and 12 including the components of the base resin out of the range of the present invention suffered from deterioration in fluidity and heat resistance or in fluidity and impact resistance, as compared with the compositions of Examples 1 to 4; and the composition of Comparative Example 13 containing an excess of the styrene-based block copolymer resin suffered from significant deterioration in fluidity and heat resistance, as compared with the compositions of Examples 1 to 4; and the composition of Comparative Examples 14 containing an excess of the hydrocarbon-based oil suffered from significant deterioration in heat resistance, as compared with the compositions of Examples 1 to 4.

It should be understood that various modifications, changes, alterations, and equivalent embodiments can be made by those skilled in the art without departing from the spirit and scope of the present invention.

The invention claimed is:

1. A thermoplastic resin composition comprising:
100 parts by weight of a base resin comprising about 20 wt % to about 80 wt % of a polyphenylene ether resin and about 20 wt % to about 80 wt % of a rubber-reinforced polystyrene resin;
about 1 part by weight to about 20 parts by weight of a styrene-based block copolymer resin; and
about 0.5 parts by weight to about 15 parts by weight of a hydrocarbon-based oil, wherein:
the hydrocarbon-based oil and the polyphenylene ether resin are present in a weight ratio of about 1:4 to about 1:20;
the styrene-based block copolymer resin and the polyphenylene ether resin are present in a weight ratio of about 1:4 to about 1:10; and
the thermoplastic resin composition has a melt index of about 17 g/10 min to about 35 g/10 min, as measured in accordance with ASTM D1238 (280° C., 5 kg), a heat deflection temperature (HDT) of about 103° C. or more, as measured on a 6.4 mm thick specimen under a load of 18.6 kgf/cm² in accordance with ASTM D648, and an Izod impact strength of about 25 kgf·cm/cm to about 50 kgf·cm/cm, as measured on a ⅛" thick specimen in accordance with ASTM D256.

2. The thermoplastic resin composition according to claim 1, wherein the polyphenylene ether resin comprises poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, a copolymer of poly(2,6-dimethyl-1,4-phenylene)ether and poly(2,3,6-trimethyl-1,4-phenylene)ether, and/or a copolymer of poly(2,6-dimethyl-1,4-phenylene)ether and poly(2,3,6-triethyl-1,4-phenylene)ether.

3. The thermoplastic resin composition according to claim 1, wherein the rubber-reinforced polystyrene resin comprises a first rubber-reinforced polystyrene resin and a second rubber-reinforced polystyrene resin in a weight ratio of about 0.3:1 to about 5:1,
the first rubber-reinforced polystyrene resin comprising a rubber polymer having an average particle diameter of about 0.1 μm to less than about 0.8 μm,
the second rubber-reinforced polystyrene resin comprising a rubber polymer having an average particle diameter of about 0.8 μm to about 4 μm.

4. The thermoplastic resin composition according to claim 1, wherein the styrene-based block copolymer resin is a block copolymer comprising repeat units of soft segment-hard segment-soft segment,
the soft segment comprising a repeat unit derived from ethylene, isoprene, propylene or butylene,
the hard segment comprising a repeat unit derived from styrene.

5. The thermoplastic resin composition according to claim 1, wherein the styrene-based block copolymer resin comprises about 10 wt % to about 40 wt % of the hard segment and about 60 wt % to about 90 wt % of the soft segment.

6. The thermoplastic resin composition according to claim 1, wherein the hydrocarbon-based oil comprises about 20 wt % to about 40 wt % of naphthene oil and about 60 wt % to about 80 wt % of paraffin oil.

7. The thermoplastic resin composition according to claim 1, wherein the hydrocarbon-based oil has a weight average molecular weight of about 500 g/mol to about 1,000 g/mol, a specific gravity of about 0.5 to about 1.0 under conditions of 4° C. and 1 atm., a pour point of about −20° C. to about 0° C., a flash point of about 200° C. to about 350° C., and a kinematic viscosity of about 50 cSt to about 300 cSt at 40° C.

8. A molded product formed of the thermoplastic resin composition according to claim 1.

* * * * *